US009524427B2

(12) United States Patent
Matsuda

(10) Patent No.: US 9,524,427 B2
(45) Date of Patent: Dec. 20, 2016

(54) IMAGE PROCESSING SYSTEM, IMAGE PROCESSING APPARATUS, IMAGE PROCESSING METHOD, AND PROGRAM

(71) Applicant: SONY CORPORATION, Tokyo (JP)

(72) Inventor: Kouichi Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/930,089

(22) Filed: Nov. 2, 2015

(65) Prior Publication Data
US 2016/0055373 A1 Feb. 25, 2016

Related U.S. Application Data

(63) Continuation of application No. 13/084,339, filed on Apr. 11, 2011, now Pat. No. 9,195,302.

(30) Foreign Application Priority Data

Apr. 19, 2010 (JP) ................ P2010-095877

(51) Int. Cl.
*G09G 5/00* (2006.01)
*G06K 9/00* (2006.01)
(Continued)

(52) U.S. Cl.
CPC ......... *G06K 9/00389* (2013.01); *G02B 27/017* (2013.01); *G06F 3/005* (2013.01);
(Continued)

(58) Field of Classification Search
CPC .......... G06F 3/011; G06F 3/13; G06T 19/006; G02B 27/017
(Continued)

(56) References Cited

U.S. PATENT DOCUMENTS 6,215,498 B1    4/2001  Filo et al.

FOREIGN PATENT DOCUMENTS

JP   2005-063091 A   3/2005
JP   2007-042073 A   2/2007

OTHER PUBLICATIONS

Buchmann et al., FingARtips—Gesture Based Direct Manipulation in Augmented Reality, Dec. 2004, ACM, 212-221.*

(Continued)

*Primary Examiner* — Barry Drennan
*Assistant Examiner* — Robert Craddock
(74) *Attorney, Agent, or Firm* — Chip Law Group

(57) ABSTRACT

There is provided an image processing apparatus including: a communication unit receiving first feature amounts, which include coordinates of feature points in an image acquired by another image processing apparatus, and position data showing a position in the image of a pointer that points at a location in a real space; an input image acquisition unit acquiring an input image by image pickup of the real space; a feature amount generating unit generating second feature amounts including coordinates of feature points set in the acquired input image; a specifying unit comparing the first feature amounts and the second feature amounts and specifying, based on a comparison result and the position data, a position in the input image of the location in the real space being pointed at by the pointer; and an output image generating unit generating an output image displaying an indicator indicating the specified position.

12 Claims, 11 Drawing Sheets

(51) Int. Cl.
*G06T 19/00* (2011.01)
*G06F 3/13* (2006.01)
*G06F 3/01* (2006.01)
*G06F 3/03* (2006.01)
*G02B 27/01* (2006.01)
*G06F 3/00* (2006.01)
*G06K 9/46* (2006.01)

(52) U.S. Cl.
CPC ............ *G06F 3/011* (2013.01); *G06F 3/0304* (2013.01); *G06F 3/13* (2013.01); *G06K 9/4671* (2013.01); *G06T 19/006* (2013.01)

(58) Field of Classification Search
USPC .................................................. 345/632–633
See application file for complete search history.

(56) References Cited

OTHER PUBLICATIONS

Takaseki et al., Development and Evaluation of a Star Interaction System with Finger Pointing, Material for Research Group of Japanese Society for Artificial Intelligence-SIG-ALST-A603-11(03/19), Mar. 18, 2007, pp. 59-64.
Asai et al., Dual Face Interaction in Handheld Augmented Reality Environments, Dec. 16, 2006, Multimedia, 2009. ISM'09. 11th IEEE International Symposium on, pp. 187-193.

\* cited by examiner

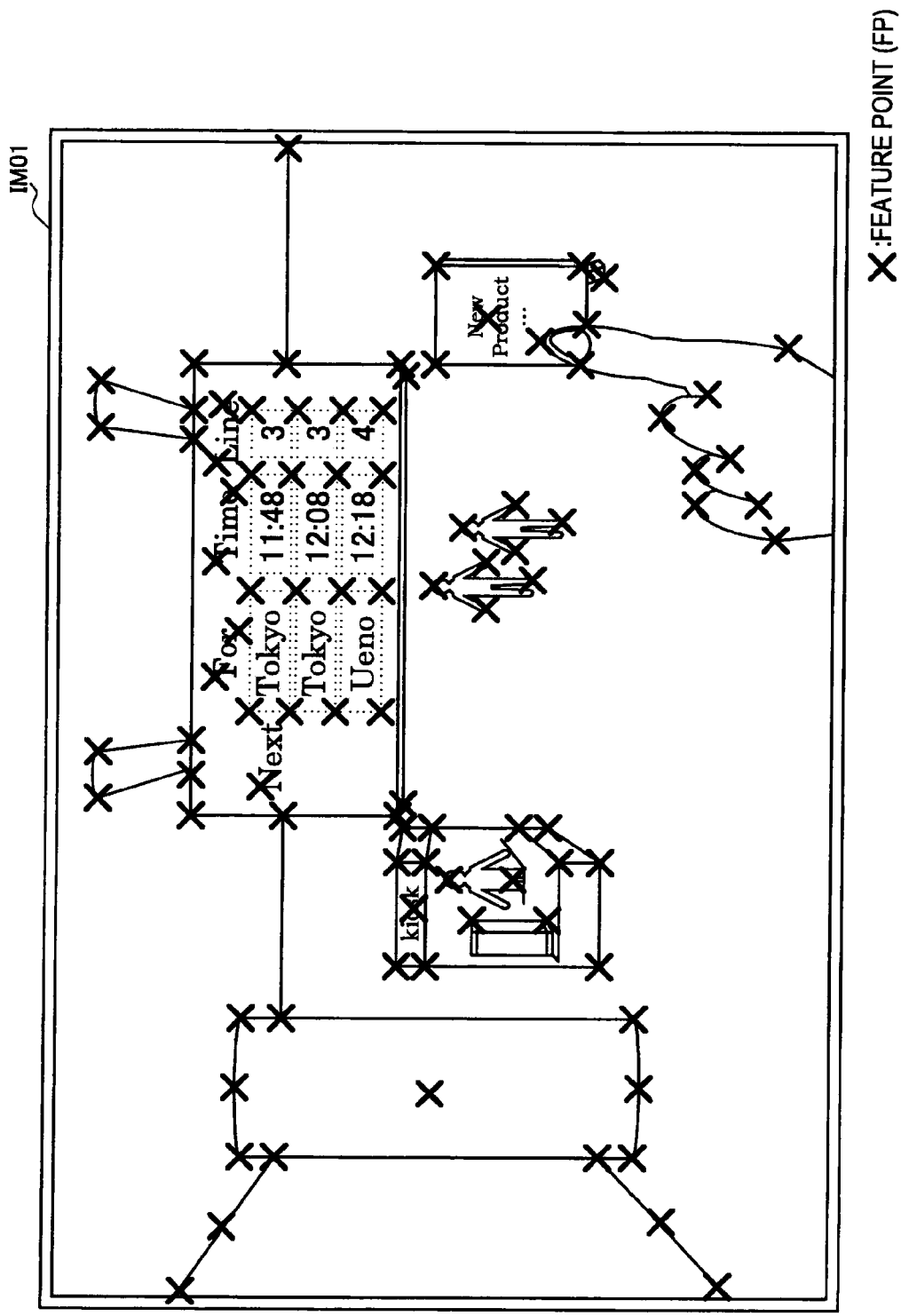

IMAGE PROCESSING SYSTEM, IMAGE PROCESSING APPARATUS, IMAGE PROCESSING METHOD, AND PROGRAM

CROSS-REFERENCE TO RELATED APPLICATION

The present application is a continuation of U.S. patent application Ser. No. 13/084,339 filed on Apr. 11, 2011 which claims priority of Japanese Patent Application No. JP 2010-095877 filed in the Japan Patent Office on Apr. 19, 2010, the entire contents of which are hereby incorporated by reference.

BACKGROUND OF THE INVENTION

1. Field of the Invention

The present invention relates to an image processing system, an image processing apparatus, an image processing method, and a program.

2. Description of the Related Art

When communication is carried out between people, it is very common for a person to share recognition for a location that appears in his/her field of vision (for example, a location where a person or thing that is currently being talked about is present) to other people by pointing to such location with his/her finger. However, aside from cases where such person is capable of directly touching the location in question with his/her finger, in many cases the listener is unable to correctly recognize the location that the pointer (i.e., the person doing the pointing) is pointing at. In such situations, if the pointer is able to describe the location verbally, it becomes easier for the listener to recognize the pointer's intended location from the combination of the pointing and the verbal description. However, when it is difficult to describe the location verbally, such combination of methods cannot be used. As another example, during a meeting, it is common for a speaker to indicate a location to other attendees by pointing using a laser pointer. However, in typical situations in the real world, users do not always have a laser pointer with them, and even if they do, a laser pointer can be dangerous if misused.

However, there is a technology for detecting a user's finger that appears in picked-up images and operating an electronic appliance based on the detected shape, position, or gesture of the user's finger. For example, Japanese Laid-Open Patent Publication No. 2005-63091 discloses a technology that is capable of detecting the shape, etc. of a users' finger with high precision by scanning the width of the user's arm along scan lines set based on a center axis of the user's arm that appears in picked-up images.

SUMMARY OF THE INVENTION

However, it has not been possible to directly apply a conventional method of detecting the user's finger that appears in picked-up images to communication between people. The main reason for this is that the direction of the line of vision differs between users. Even if the pointer points at a certain location with his/her finger, the line of vision of the pointer and the line of vision of the listener when looking at such finger will probably be two straight lines that cross at a single point and therefore be different directions. This means that even if the pointer's finger is detected with high precision in an image acquired by an image pickup apparatus that is oriented in the direction of the line of vision of a listener, for example, a location that coincides with the finger will not be the location that the pointer is trying to indicate.

For this reason, the present invention aims to provide a novel and improved image processing system, image processing apparatus, image processing method, and program that enable users with lines of vision that differ in direction to correctly and easily recognize a location being pointed at during communication between a plurality of people.

According to an embodiment of the present invention, there is provided an image processing system including first and second image processing apparatuses that each include an input image acquisition unit acquiring an input image produced by image pickup of a real space. The first image processing apparatus further includes an image recognition unit recognizing a pointer appearing in a first input image acquired in the first image processing apparatus, the pointer being used to point at a location in the real space, a first feature amount generating unit generating first feature amounts including coordinates of a plurality of feature points set in the first input image, and a first communication unit transmitting first feature amounts generated for the first input image and position data showing a position of the pointer recognized by the image recognition unit, and the second image processing apparatus further includes a second feature amount generating unit generating second feature amounts including coordinates of a plurality of feature points set in a second input image acquired in the second image processing apparatus, a second communication unit receiving the first feature amounts and the position data, a specifying unit comparing the first feature amounts and the second feature amounts and specifying, based on a result of the comparing and the position data, a position in the second input image of the location in the real space being pointed at by the pointer, and an output image generating unit generating an output image displaying an indicator indicating the position specified by the specifying unit.

The first image processing apparatus may further include a storage unit storing a finger image for recognizing the user's finger as the pointer, and the image recognition unit recognizes the pointer by detecting the finger image appearing in the first input image.

The first feature amounts may include a plurality of sets of coordinates of feature points respectively set in the first input image when the first input image has been rotated in each of a plurality of line of vision directions, and the specifying unit may select one out of the plurality of line of vision directions by comparing the second feature amounts with each set out of the sets of coordinates of feature points included in the first feature amounts.

The specifying unit may generate, from the first feature amounts, a plurality of sets of coordinates of feature points respectively set in the first input image for a case where the first input image has been rotated in each of a plurality of line of vision directions and, by comparing the second feature amounts with each set out of the generated plurality of sets of coordinates of feature points, selects one out of the plurality of line of vision directions.

The specifying unit may specify, based on the selected line of vision direction and the position data, a position in the second input image of the location in the real space pointed at by the pointer.

The output image generating unit may generate the output image that displays a graphic surrounding a position specified by the specifying unit as the indicator.

According to another embodiment of the present invention, there is provided an image processing apparatus including a communication unit receiving first feature amounts, which include coordinates of a plurality of feature points set in an image acquired by another image processing apparatus, and position data showing a position in the image of a pointer used to point at a location in a real space, an input image acquisition unit acquiring an input image produced by image pickup of the real space, a feature amount generating unit generating second feature amounts including coordinates of a plurality of feature points set in the input image acquired by the input image acquisition unit, a specifying unit comparing the first feature amounts and the second feature amounts and specifying, based on a result of the comparing and the position data, a position in the input image of the location in the real space being pointed at by the pointer, and an output image generating unit generating an output image displaying an indicator indicating the position specified by the specifying unit.

The first feature amounts may include a plurality of sets of coordinates of feature points respectively set in the image when the image has been rotated in each of a plurality of line of vision directions, and the specifying unit may select one out of the plurality of line of vision directions by comparing the second feature amounts with each set out of the sets of coordinates of feature points included in the first feature amounts.

The specifying unit may generate, from the first feature amounts, a plurality of sets of coordinates of feature points respectively set in the image for a case where the image has been rotated in each of a plurality of line of vision directions and, by comparing the second feature amounts with each set out of the generated plurality of sets of coordinates of feature points, select one out of the plurality of line of vision directions.

The specifying unit may specify, based on the selected line of vision direction and the position data, a position in the input image of the location in the real space pointed at by the pointer.

The output image generating unit may generate the output image that displays a graphic surrounding a position specified by the specifying unit as the indicator.

According to another embodiment of the present invention, there is provided an image processing method carried out by first and second image processing apparatuses that each acquire an input image produced by image pickup of a real space, the image processing method including steps of the first image processing apparatus, acquiring a first input image, recognizing a pointer appearing in the acquired first input image, the pointer being used to point at a location in the real space, generating first feature amounts including coordinates of a plurality of feature points set in the first input image, and transmitting first feature amounts generated for the first input image and position data showing a position of the recognized pointer, and further including steps of the second image processing apparatus, receiving the first feature amounts and the position data, acquiring a second input image, generating second feature amounts including coordinates of a plurality of feature points set in the acquired second input image, comparing the first feature amounts and the second feature amounts, specifying, based on a result of the comparing and the position data, a position in the second input image of the location in the real space being pointed at by the pointer, and generating an output image displaying an indicator indicating the specified position.

According to another embodiment of the present invention, there is provided an image processing method carried out by an image processing apparatus, including steps of, receiving first feature amounts, which include coordinates of a plurality of feature points set in an image acquired by another image processing apparatus, and position data showing a position in the image of a pointer used to point at a location in a real space, acquiring an input image produced by image pickup of the real space, generating second feature amounts including coordinates of a plurality of feature points set in the acquired input image, comparing the first feature amounts and the second feature amounts, specifying, based on a result of the comparing and the position data, a position in the input image of the location in the real space being pointed at by the pointer, and generating an output image displaying an indicator indicating the specified position.

According to another embodiment of the present invention, there is provided a program causing a computer that controls an image processing apparatus to function as a communication unit receiving first feature amounts, which include coordinates of a plurality of feature points set in an image acquired by another image processing apparatus, and position data showing a position in the image of a pointer used to point at a location in a real space, an input image acquisition unit acquiring an input image produced by image pickup of the real space, a feature amount generating unit generating second feature amounts including coordinates of a plurality of feature points set in the input image acquired by the input image acquisition unit, a specifying unit comparing the first feature amounts and the second feature amounts and specifying, based on a result of the comparing and the position data, a position in the input image of the location in the real space being pointed at by the pointer, and an output image generating unit generating an output image displaying an indicator indicating the position specified by the specifying unit.

According to the image processing system, the image processing apparatus, the image processing method, and the program according to embodiments of the present invention described above, it is possible to enable users with lines of vision that differ in direction to correctly and easily recognize a location being pointed at during communication between a plurality of people.

BRIEF DESCRIPTION OF THE DRAWINGS

FIG. 5 is a diagram useful in explaining feature points set in a first input image according to an embodiment of the present invention;

DETAILED DESCRIPTION OF THE EMBODIMENTS

Figure 1:
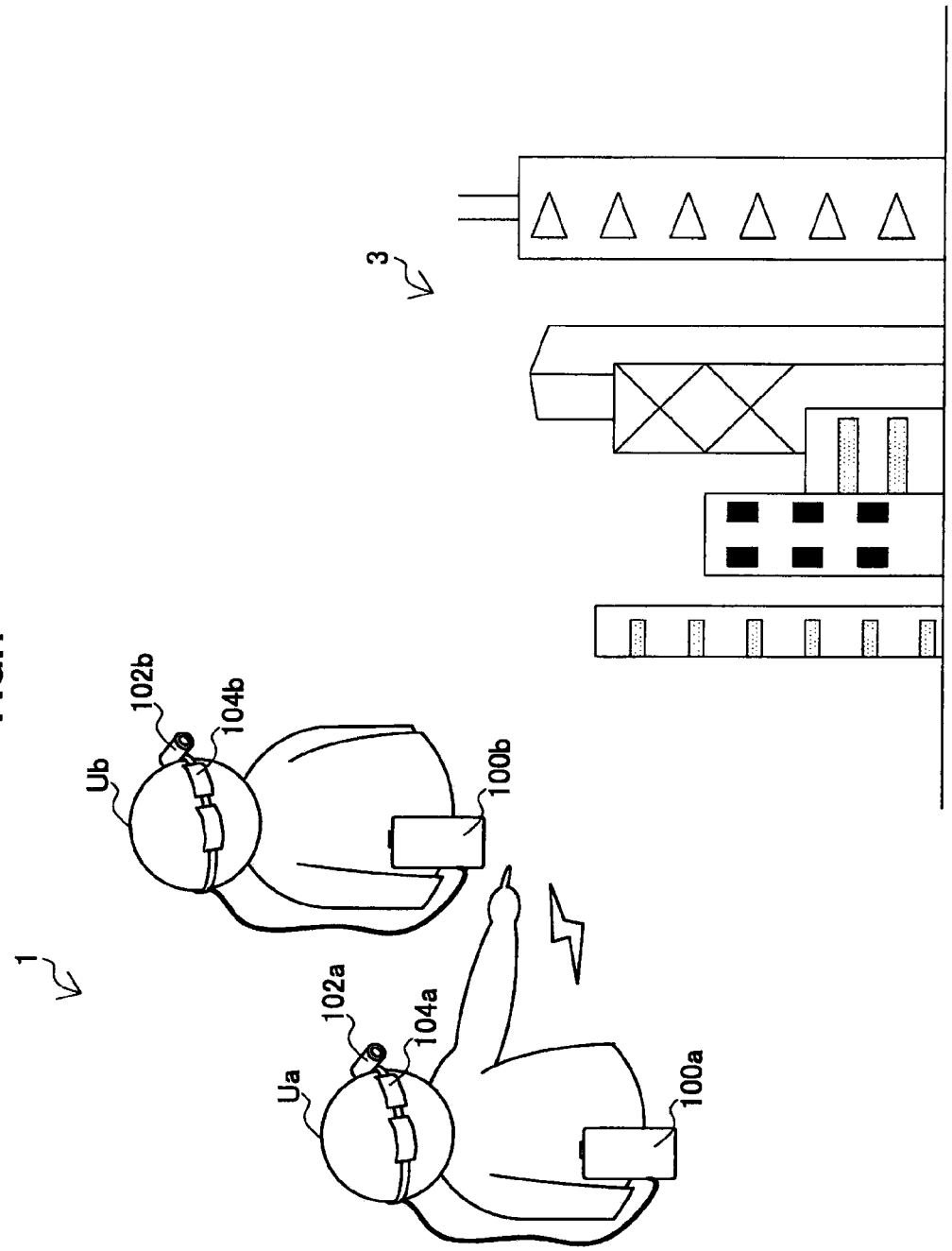
FIG. 1 is a schematic drawing showing an overview of an image processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. Overview of Image Processing System According to an Embodiment of the Present Invention
2. Example Configuration of Image Processing Apparatus According to an Embodiment of the Present Invention
   2-1. Overall Configuration
   2-2. Pointer Side
   2-3. Receiver Side
3. Flow of Image Processing According to an Embodiment of the Present Invention
   3-1. Pointer Side
   3-2. Receiver Side
4. Conclusion

1. OVERVIEW OF IMAGE PROCESSING SYSTEM ACCORDING TO AN EMBODIMENT OF THE PRESENT INVENTION

First, an overview of an image processing system according to an embodiment of the present invention will be described with reference to FIG. 1. FIG. 1 is a schematic drawing showing an overview of an image processing system 1 according to an embodiment of the present invention. As shown in FIG. 1, the image processing system 1 includes an image processing apparatus 100a used by a user Ua and an image processing apparatus 100b used by a user Ub.

As one example, the image processing apparatus 100a is connected to an image pickup apparatus 102a and a head-mounted display (HMD) 104a that are mounted on the user Ua's head. The image pickup apparatus 102a is oriented in the direction of the line of vision of the user Ua, picks up images of a real space 3, and outputs a series of input images to the image processing apparatus 100a. The HMD 104a displays images inputted from the image processing apparatus 100a to the user Ua. The images displayed by the HMD 104a are output images generated by the image processing apparatus 100a. The HMD 104a may be a see-through display or may be a non see-through display.

As one example, the image processing apparatus 100b is connected to an image pickup apparatus 102b and an HMD 104b that are mounted on the user Ub's head. The image pickup apparatus 102b is oriented in the direction of the line of vision of the user Ub, picks up images of the real space 3, and outputs a series of input images to the image processing apparatus 100b. The HMD 104b displays images inputted from the image processing apparatus 100b to the user Ub. The images displayed by the HMD 104b are output images generated by the image processing apparatus 100b. The HMD 104b may be a see-through display or may be a non see-through display.

The image processing apparatuses 100a and 100b are capable of communicating with one another via a communication connection that may be wired or wireless. As examples, the communication between the image processing apparatus 100a and the image processing apparatus 100b may be carried out directly by a P2P (Peer to Peer) method or may be carried out indirectly via another apparatus such as a router or a server (not shown).

In the example in FIG. 1, the user Ua and the user Ub are both facing in the direction of the real space 3. The user Ua is also pointing his/her finger at a location where a person, object, or the like that is the subject of conversation, for example, is present. At this time, in the input images inputted from the image pickup apparatus 102a into the image processing apparatus 100a, the finger of the user Ua will probably just be pointing such location. However, in the input images inputted from the image pickup apparatus 102b into the image processing apparatus 100b, there is the possibility that the user Ua's finger will be displaced from such location. For this reason, in the image processing system 1 according to the present embodiment, by using an arrangement that will be described in detail later, it becomes possible for the user Ub to correctly and easily recognize the location that the user Ua is pointing at.

Note that the image processing apparatuses 100a and 100b are not limited to the examples shown in FIG. 1. As one example, the image processing apparatus 100a or 100b may be realized using a camera-equipped mobile terminal. In such case, after the camera of the camera-equipped mobile terminal has picked up images of the real space and image processing has been carried out by the terminal, output images are displayed on the screen of the terminal. The image processing apparatus 100a or 100b may be another type of apparatus such as a PC (Personal Computer) or a game console.

Hereinafter, in this specification, aside from when it is necessary to distinguish between the image processing apparatuses 100a and 100b, the letters appended to the reference numerals are omitted and such image processing apparatuses 100a and 100b are collectively referred to as the "information processing apparatus 100". The other component elements are treated in the same way, with the image pickup apparatuses 102a and 102 being referred to as the "image pickup apparatus 102" and the HMD 104a and 104b as the "HMD 104". The number of image processing apparatuses 100 that can participate in the image processing system 1 is also not limited to the example shown in FIG. 1 and may be three or higher. That is, as one example, a third image processing apparatus 100 used by a third user may also be included in the image processing system 1.

2. EXAMPLE CONFIGURATION OF IMAGE PROCESSING APPARATUS ACCORDING TO AN EMBODIMENT OF THE PRESENT INVENTION

2-1. Overall Configuration

Figure 2:
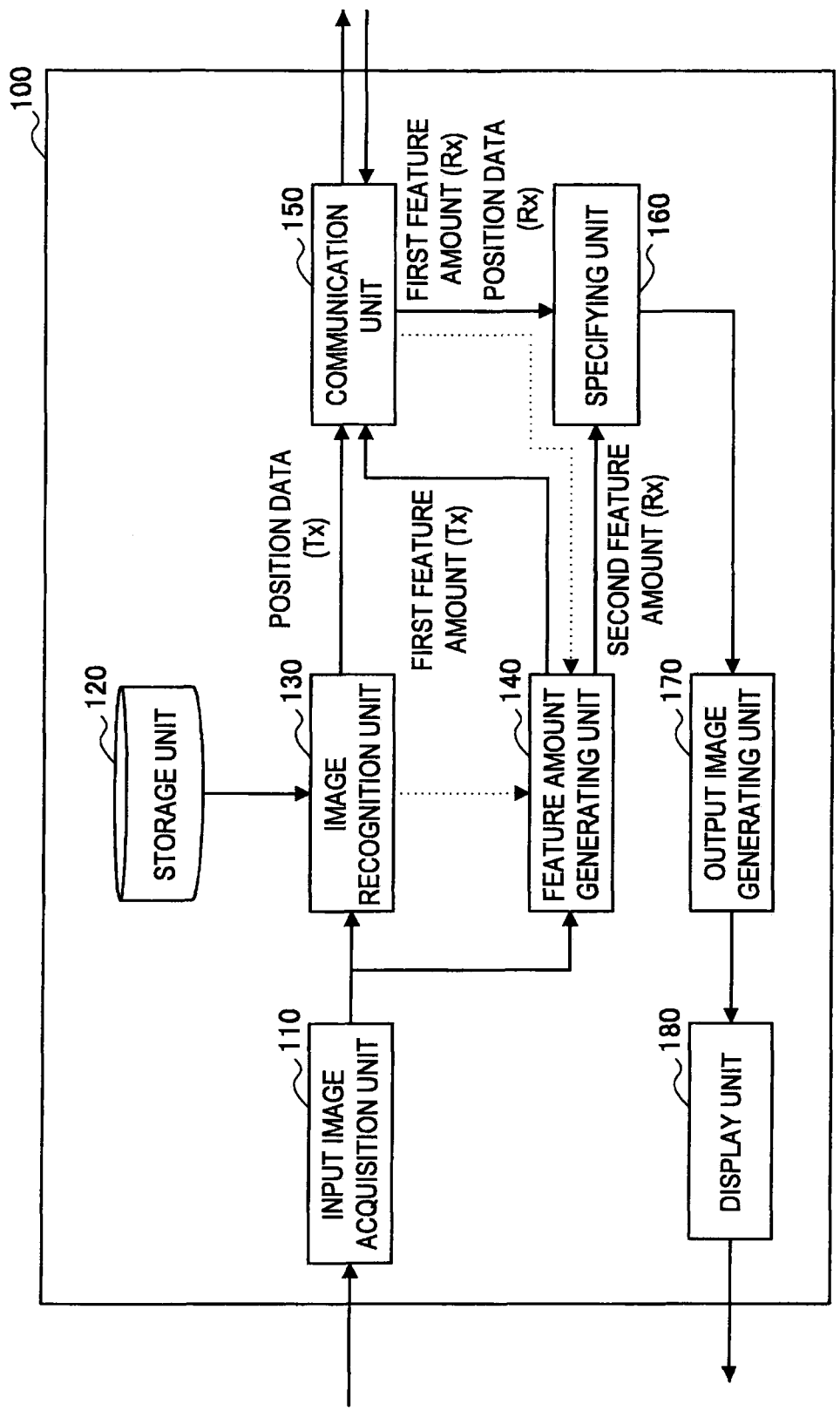
FIG. 2 is a block diagram showing one example of the configuration of an image processing apparatus according to an embodiment of the present invention.

The configuration of an image processing apparatus 100 according to the present embodiment will be described next with reference to FIGS. 2 to 9. FIG. 2 is a block diagram showing one example of the configuration of an image processing apparatus 100 according to the present embodiment. As shown in FIG. 2, each image processing apparatus 100 includes an input image acquisition unit 110, a storage unit 120, an image recognition unit 130, a feature amount generating unit 140, a communication unit 150, a specifying unit 160, an output image generating unit 170, and a display unit 180.

Note that when an image processing apparatus 100 is operating on the side of the pointing user who is pointing at a location (for example, the user Ua in FIG. 1, hereinafter referred to as the "pointer side"), out of the component elements of the image processing apparatus 100 shown in FIG. 2, mainly the input image acquisition unit 110, the storage unit 120, the image recognition unit 130, the feature amount generating unit 140, and the communication unit 150 participate in image processing. Meanwhile, on the side of the listening user to whom the location is being pointed out (for example, the user Ub in FIG. 1, hereinafter the "receiver side"), out of the component elements of the image processing apparatus 100 shown in FIG. 2, mainly the input image acquisition unit 110, the feature amount generating unit 140, the communication unit 150, the specifying unit 160, the output image generating unit 170, and the display unit 180 participate in image processing.

An example where each image processing apparatus 100 is equipped with both the configuration for the pointer side and the configuration for the receiver side is described here. However, the present invention is not limited to this example and an image processing apparatus equipped with only one of the configuration for the pointer side and the configuration for the receiver side may be provided.

2-2. Pointer Side

Input Image Acquisition Unit

Figure 3:
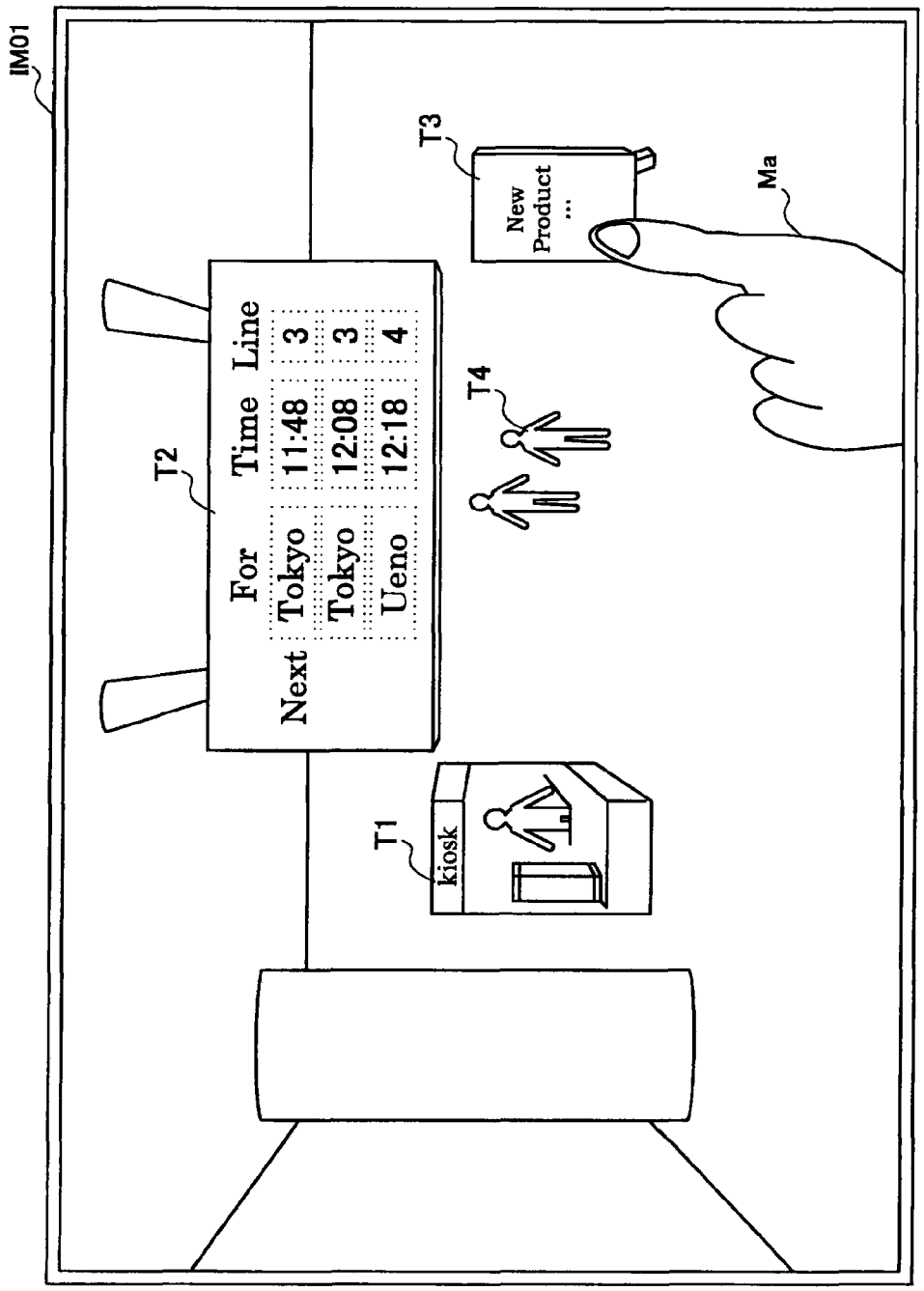
FIG. 3 is a diagram useful in explaining one example of an input image according to an embodiment of the present invention.

The input image acquisition unit 110 acquires a series of input images picked up using the image pickup apparatus 102. FIG. 3 shows an input image IM01 as one example of an image acquired by the input image acquisition unit 110. A variety of subjects that are present in the real space 3 appear in the input image IM01. In the example in FIG. 3, the real space 3 is a space within a station building, so that subjects such as a kiosk T1, a departures board T2, a sign T3, and a person T4 appear in the input image IM01. A pointer Ma also appears in the input image IM01. Here, the pointer Ma is the user Ua's finger. The input image acquisition unit 110 successively outputs such input images that have been acquired to the image recognition unit 130 and the feature amount generating unit 140.

Storage Unit

The storage unit 120 uses a storage medium such as a hard-disk drive, a semiconductor memory, or the like, and stores in advance one or more pointer images to be used in image recognition when recognizing a pointer appearing in input images. In the present specification, the expression "pointer" refers to an object or a part of the human body used by the user to point at an arbitrary location in the real space.

Figure 4A:
FIG. 4A is a schematic drawing showing one example of a pointer according to an embodiment of the present invention.
Figure 4B:
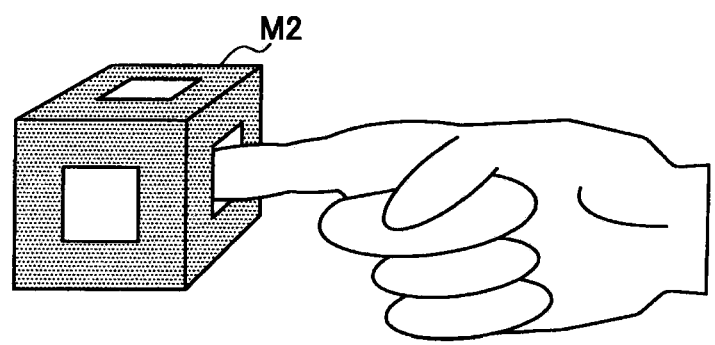
FIG. 4B is a schematic drawing showing another example of a pointer according to an embodiment of the present invention.

FIGS. 4A and 4B are schematic drawings showing examples of pointers according to the present embodiment. In the example in FIG. 4A, a pointer M1 is the finger (on the hand) of the user. As one example, the storage unit 120 stores an image in which the user's finger appears in advance as a pointer image. The storage unit 120 may also store a group of images in which the user's finger is shown from a plurality of different directions as pointer images.

In the example in FIG. 4B, a pointer M2 is a cubic marker mounted on the user's finger. A cavity is provided in the center of each surface of the marker so that the user can insert his/her finger into the cavity and move the marker. In such case, the storage unit 120 stores in advance an image in which the marker appears as a pointer image. As an alternative, the combination of the marker and the finger inserted into the marker may be treated as a pointer and an image in which the marker and the finger appear may be stored as a pointer image.

Note that the pointer is not limited to the examples shown in FIGS. 4A and 4B and as examples, may be a part of the body or an arbitrary object present in the real world, such as the user's foot or a stick-like object grasped by the user. The storage unit 120 outputs the pointer images to the image recognition unit 130 in accordance with requests from the image recognition unit 130.

Image Recognition Unit

The image recognition unit 130 recognizes the pointer appearing in an input image acquired by the input image acquisition unit 110. As one example, a pointer appearing in the input image may be recognized by comparing the input image with the one or more pointer images stored in the storage unit 120 using a known pattern matching method. As an alternative, instead of using pointer images, the image recognition unit 130 may recognize the user's finger as a pointer appearing in an input image using the method disclosed in Japanese Laid-Open Patent Publication No. 2005-63091, for example.

On recognizing that a pointer appears in an input image, the image recognition unit 130 also determines the position in the input image of a location at which the pointer is pointing. As one example, the image recognition unit 130 may determine that a position at the tip of the index finger of the pointer M1 illustrated in FIG. 4A is the position in the input image of the location being pointed at by the pointer M1. As another example, the image recognition unit 130 may determine that a position of a center of gravity of the marker of the pointer M2 illustrated in FIG. 4B is the position in the input image of the location being pointed at by the pointer M2.

In accordance with a request from the user, the image recognition unit 130 outputs position data showing the position of the pointer (i.e., coordinates in the input image of the position being pointed at by the pointer) recognized by the method described above to the communication unit 150. As one example, the request from the user may be inputted into the image processing apparatus 100 by a gesture made using the pointer. For example, the image recognition unit 130 may monitor changes in the size of the pointer in the input images. If, when a pointer with a size that is equal to or larger than a certain threshold has been continuously detected, the size of such pointer becomes temporarily small, for example, the image recognition unit 130 may recognize that the user has tapped some location. Such tap gesture is one example of a user input that represents a request to transfer information on the location that the user is pointing at. As other examples, the image recognition unit 130 may treat a gesture where the front end of the pointer traces a circular path, a specified shape made with the user's finger, or the like as a user input that expresses a request to transfer information. In place of image recognition by the image recognition unit 130, a request for information transfer may be inputted via a user interface such as a button or a switch provided on the image processing apparatus 100.

When a request from the user has been detected, the image recognition unit 130 outputs position data showing a position of the pointer to the communication unit 150 and also requests the feature amount generating unit 140 to generate feature amounts for the input image.

Feature Amount Generating Unit

In accordance with a request from the image recognition unit 130, the feature amount generating unit 140 sets a plurality of feature points in the input image acquired by the input image acquisition unit 110 and generates feature amounts including coordinates of the set feature points. As examples, the feature amount generating unit 140 may set the feature points in the input image according to a method that uses a known Harris operator or Moravec operator or an arbitrary method such as FAST feature detection. In addition to the coordinates of the respective feature points, the feature amounts generated by the feature amount generating unit 140 may include supplementary parameters such as the luminance, contrast, and orientation of each feature point. As one example, by using distinctive invariant features described in "Distinctive Image Features from Scale-Invariant Keypoints" (the International Journal of Computer Vision, 2004) by David G. Lowe as the feature amounts, image processing that is highly robust against noise, changes in size, rotation, changes in illumination, and the like in the image is realized.

FIG. 5 is a diagram useful in explaining feature points set in the input image by the feature amount generating unit 140 according to the present embodiment. As shown in FIG. 5, a large number of feature points shown using "X" marks are set in the input image IM01 illustrated in FIG. 3. As one example, the feature points may be set on the edges and corners of a variety of objects in the real space 3. The feature amount generating unit 140 outputs the feature amounts, where coordinates in the input image of such feature points and the supplementary parameters described above are stored as one data set, to the communication unit 150.

Communication Unit

The communication unit 150 operates as a communication interface for enabling the image processing apparatus 100 to communicate with other apparatuses. As one example, when a user input expressing a request for information transfer has been detected by the image recognition unit 130, the communication unit 150 transmits position data of the pointer inputted from the image recognition unit 130 and feature amounts for the input image inputted from the feature amount generating unit 140 to another image processing apparatus 100.

2-3. Receiver Side

Input Image Acquisition Unit

When the image processing apparatus 100 operates as the receiver side, in the same way as the pointer side, the input image acquisition unit 110 acquires a series of input images picked up using the image pickup apparatus 102. The input image acquisition unit 110 then successively outputs the acquired input images to the feature amount generating unit 140.

Figure 6:
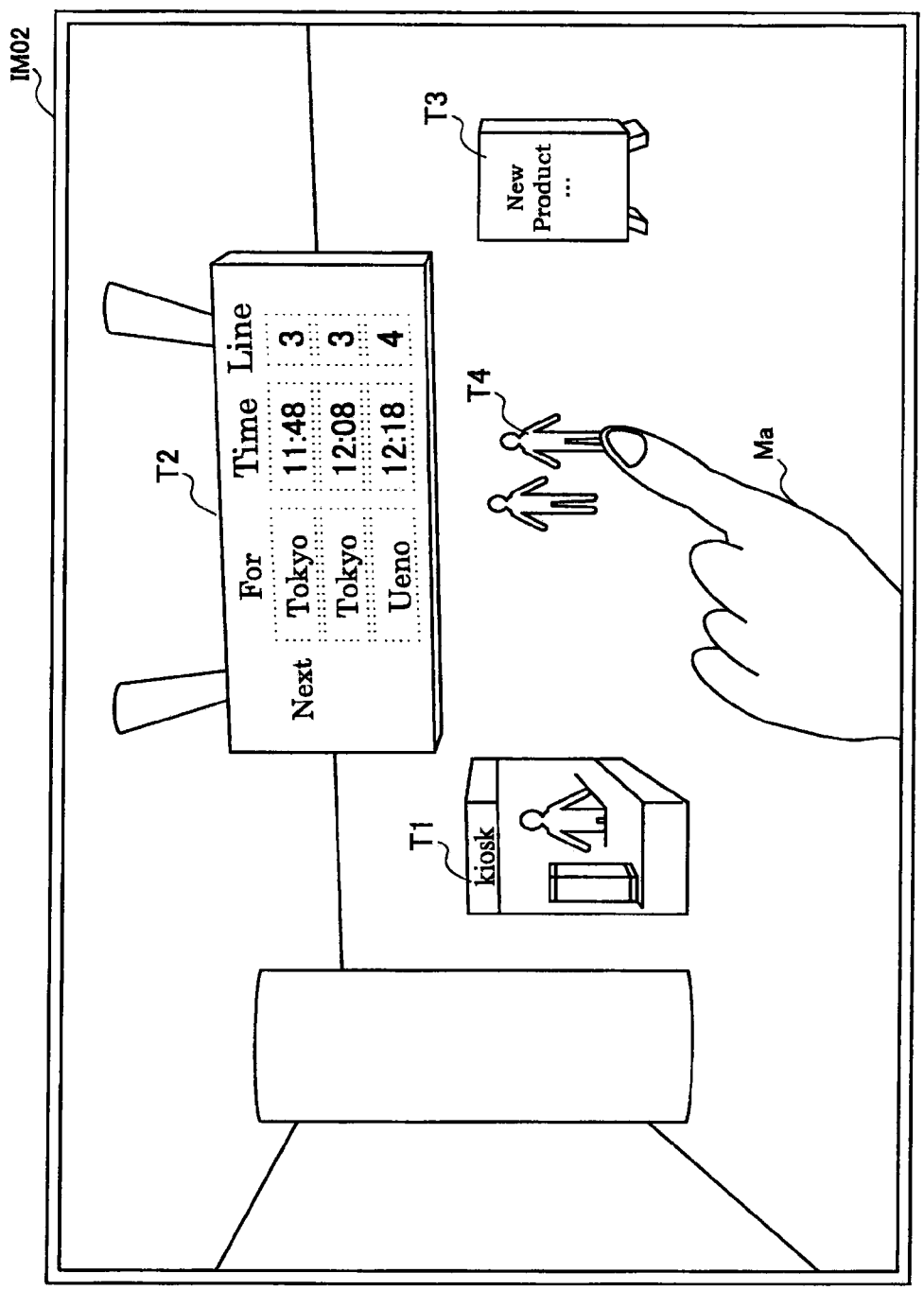
FIG. 6 is a diagram useful in explaining a second example of an input image according to an embodiment of the present invention.

FIG. 6 shows an input image IM02 as another example of an input image acquired by the input image acquisition unit 110. In the same way as in the input image IM01 illustrated in FIG. 3, a variety of subjects such as the kiosk T1, the departures board T2, the sign T3, and the person T4 present in the real space 3 appear in the input image IM02. The pointer Ma that is the finger of the user Ua also appears in the input image IM02. However, due to the difference in the direction of the line of vision, in the input image IM02, the pointer Ma is not present on the sign T3 as in the input image IM01, and is instead positioned on the person T4. Accordingly, a user who merely looks at the input image IM02 will not be able to correctly recognize what location the pointer Ma is pointing at in reality.

Communication Unit

The communication unit 150 on the receiver side receives the feature amounts and position data described above that have been transmitted from the apparatus on the pointer side. In the following description in the present specification, the feature amounts that have been transmitted by the communication unit 150 on the pointer side and received by the communication unit 150 on the receiver side are referred to as "first feature amounts". When the first feature amounts and the position data have been received, the communication unit 150 outputs the first feature amounts and the position data to the specifying unit 160 and requests the feature amount generating unit 140 to generate second feature amounts for the input image that are to be compared with the first feature amounts.

Feature Amount Generating Unit

In response to the request from the communication unit 150, the feature amount generating unit 140 on the receiver side outputs feature amounts generated for an input image acquired by the input image acquisition unit 110 to the specifying unit 160 as second feature amounts to be compared with the first feature amounts. In the same way as the first feature amounts, the second feature amounts include the coordinates of a plurality of feature points set in the input image. In addition, the second feature amounts may include supplementary parameters such as luminance, contrast, and orientation of each feature point.

Specifying Unit

The specifying unit 160 compares the first feature amounts inputted from the communication unit 150 and the second feature amounts inputted from the feature amount generating unit 140. The specifying unit 160 then specifies, based on the result of the comparing and the position data inputted from the communication unit 150, the position in the input image of the location in the real space that is being pointed at by the pointer.

Figure 7:
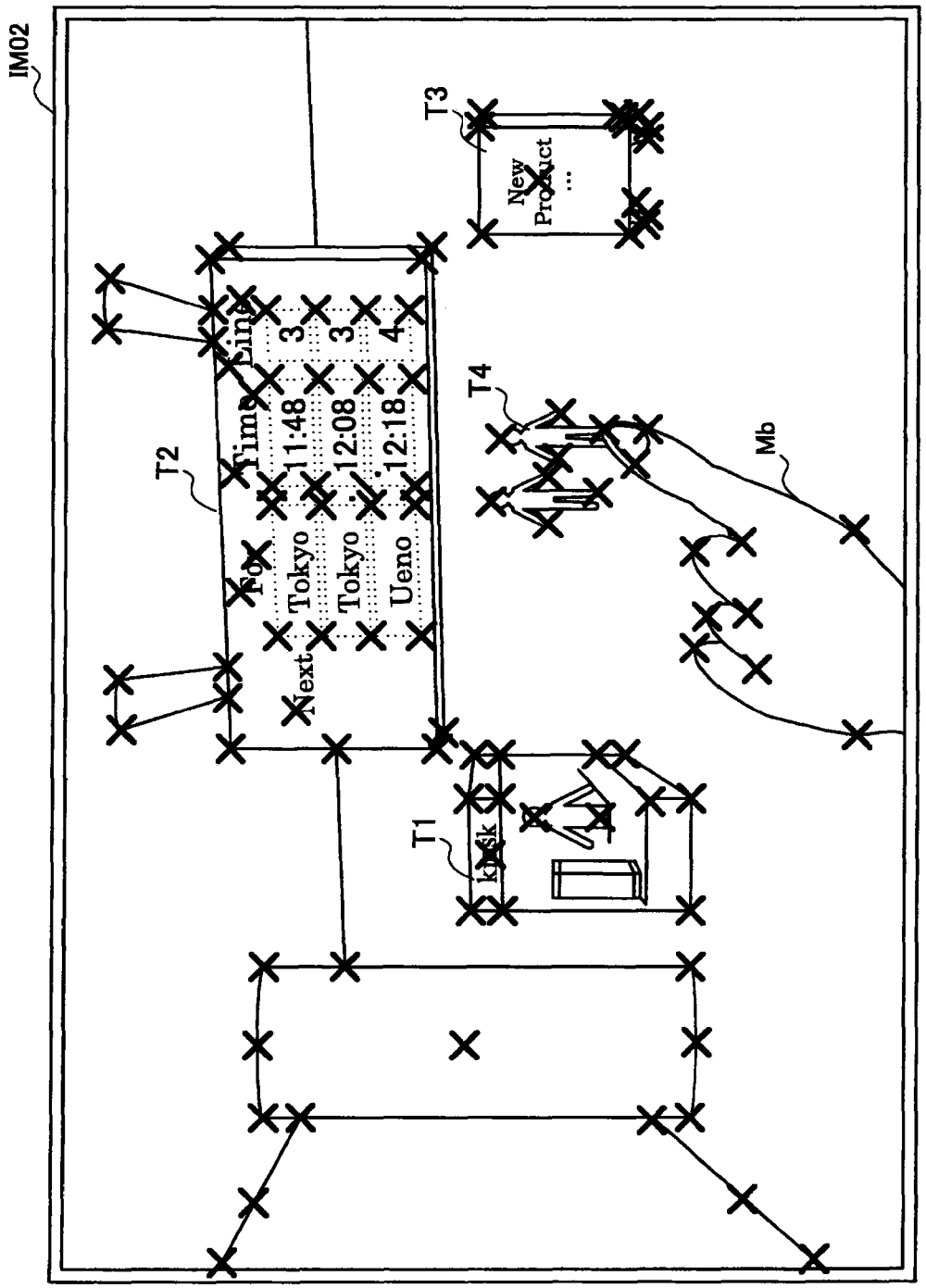
FIG. 7 is a diagram useful in explaining feature points set in a second input image according to an embodiment of the present invention.

FIG. 7 is a diagram useful in explaining feature points set in the input image IM02 illustrated in FIG. 6. As shown in FIG. 7, a large number of feature points shown using "X" marks are set in the input image IM02. The coordinates of the respective feature points in the input image IM02 differ to the coordinates of the corresponding feature points in the input image IM01. Such differences in the coordinates are due to the differences in the direction of the line of vision. For this reason, the specifying unit 160 uses, for comparison purposes, sets of feature point coordinates where the coordinates included in the first feature amounts have been rotated for each of a plurality of line of vision directions. The specifying unit 160 compares the respective sets of feature point coordinates with the second feature amounts and selects a line of vision direction corresponding to the set of feature point coordinates that best matches the feature amounts. The specifying unit 160 then specifies, based on the selected line of vision direction and the position of the pointer corresponding to such line of vision direction, the position in the input image on the receiver side of the location in the real space being pointed at by the pointer.

Figure 8:
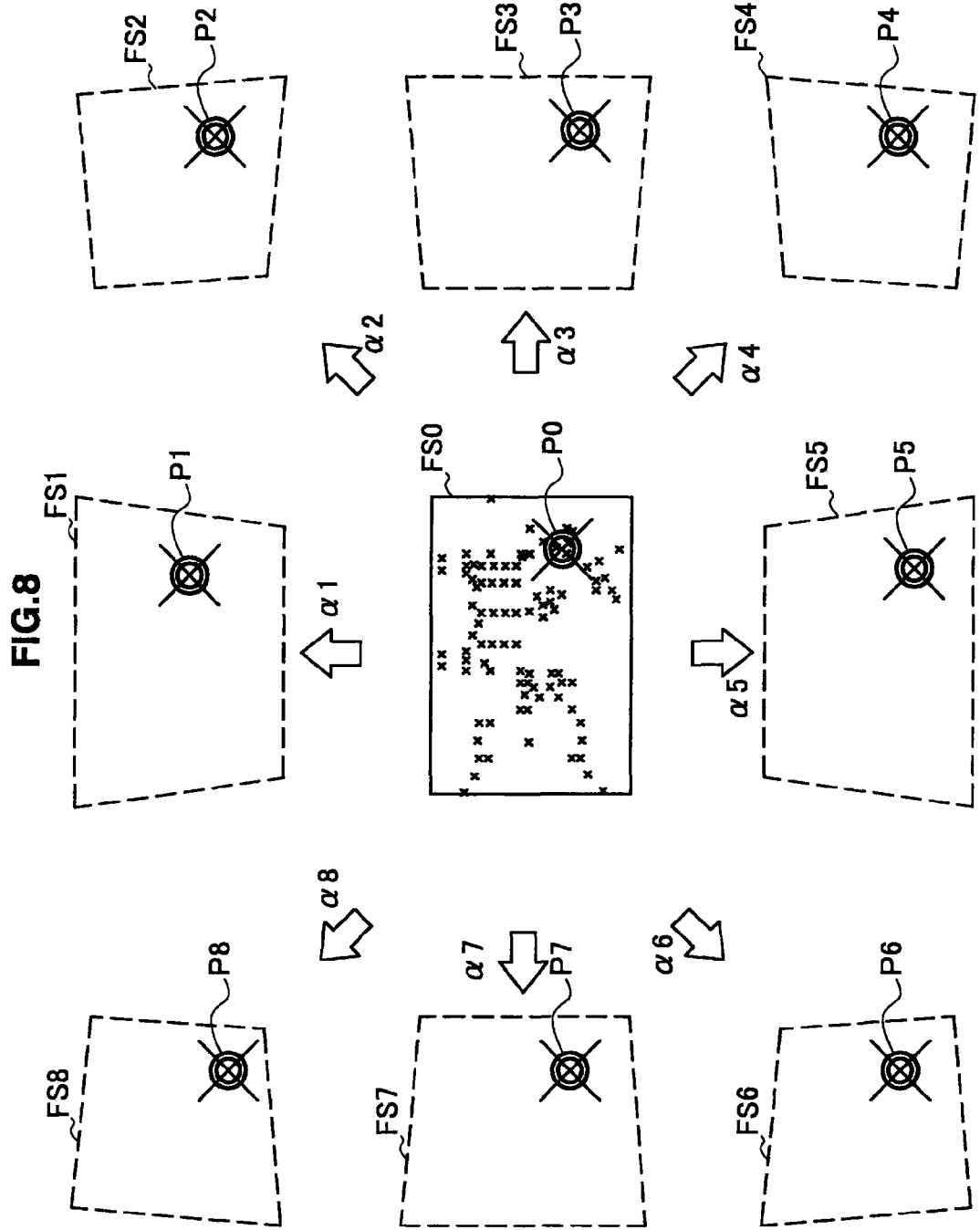
FIG. 8 is a diagram useful in explaining a comparison process for feature amounts according to an embodiment of the present invention.

FIG. 8 is a diagram useful in explaining a comparison process for feature amounts carried out by the specifying unit 160 according to the present embodiment. In the center of FIG. 8, a set FS0 of feature point coordinates and the position P0 of the pointer included in the first feature amounts are shown. By subjecting the respective coordinates of the set FS0 of feature point coordinates and the position P0 of the pointer to an affine transform or 3-D rotation, the specifying unit 160 generates a plurality of sets of feature point coordinates and a plurality of position data respectively corresponding to a plurality of directions for the line of vision. In the example in FIG. 8, eight sets FS1 to FS8 of feature point coordinates and the positions P1 to P8 of the pointer respectively corresponding to directions $\alpha 1$ to $\alpha 8$ for the line of vision are shown. As one example, the specifying unit 160 then compares the second feature amounts with respective sets out of the base set FS0 of the feature point coordinates and the sets FS1 to FS8 of feature point coordinates. If, as one example, the set FS4 of the feature point coordinates matches the second feature amounts with the smallest error, the specifying unit 160 specifies that the pointer is pointing at a location corresponding to the position P4 in the input image on the receiver side. Here, as one example, the comparing of feature points by the specifying unit 160 may be carried out according to the SIFT (Scale Invariant Feature Transform) method described in "Distinctive Image Features from Scale-Invariant Keypoints" mentioned earlier. As another example, the comparing of feature points by the specifying unit 160 may also be carried out according to a Random Ferns method described in "Fast Keypoint Recognition using Random Ferns" (IEEE Transactions on Pattern Analysis and Machine Intelligence, Vol. 32, Nr. 3, pp. 448-461, March 2010) by Mustafa Oezuysal et al.

Note that the process that generates a set of feature point coordinates for each line of vision direction from the feature amounts for the input image on the pointer side may be carried out by the feature amount generating unit 140 of the image processing apparatus 100 on the pointer side. In this case, the first feature amounts received by the communication unit 150 on the receiver side include a plurality of sets of feature point coordinates and corresponding position data for the pointer for the respective directions of the line of vision.

The specifying unit 160 specifies the position in the input image on the receiver side of the location which the pointer is pointing at in this way and outputs coordinates of the specified position to the output image generating unit 170.

Output Image Generating Unit

The output image generating unit 170 generates an output image that displays an indicator indicating the position specified by the specifying unit 160. For example, in the present embodiment, the output image generating unit 170 generates an output image that displays a graphic surrounding the position specified by the specifying unit 160 as the indicator mentioned above and outputs the generated output image to the display unit 180. Alternatively, the indicator mentioned above may be an arrow or the like that indicates the position specified by the specifying unit 160. It is also possible to create a difference in color or luminance between a region of a certain size in the periphery of the position specified by the specifying unit 160 and other regions and use such difference as the indicator mentioned above.

Display Unit

The display unit 180 displays the output image generated by the output image generating unit 170 to the user using the HMD 104.

Example of Output Image

Figure 9:
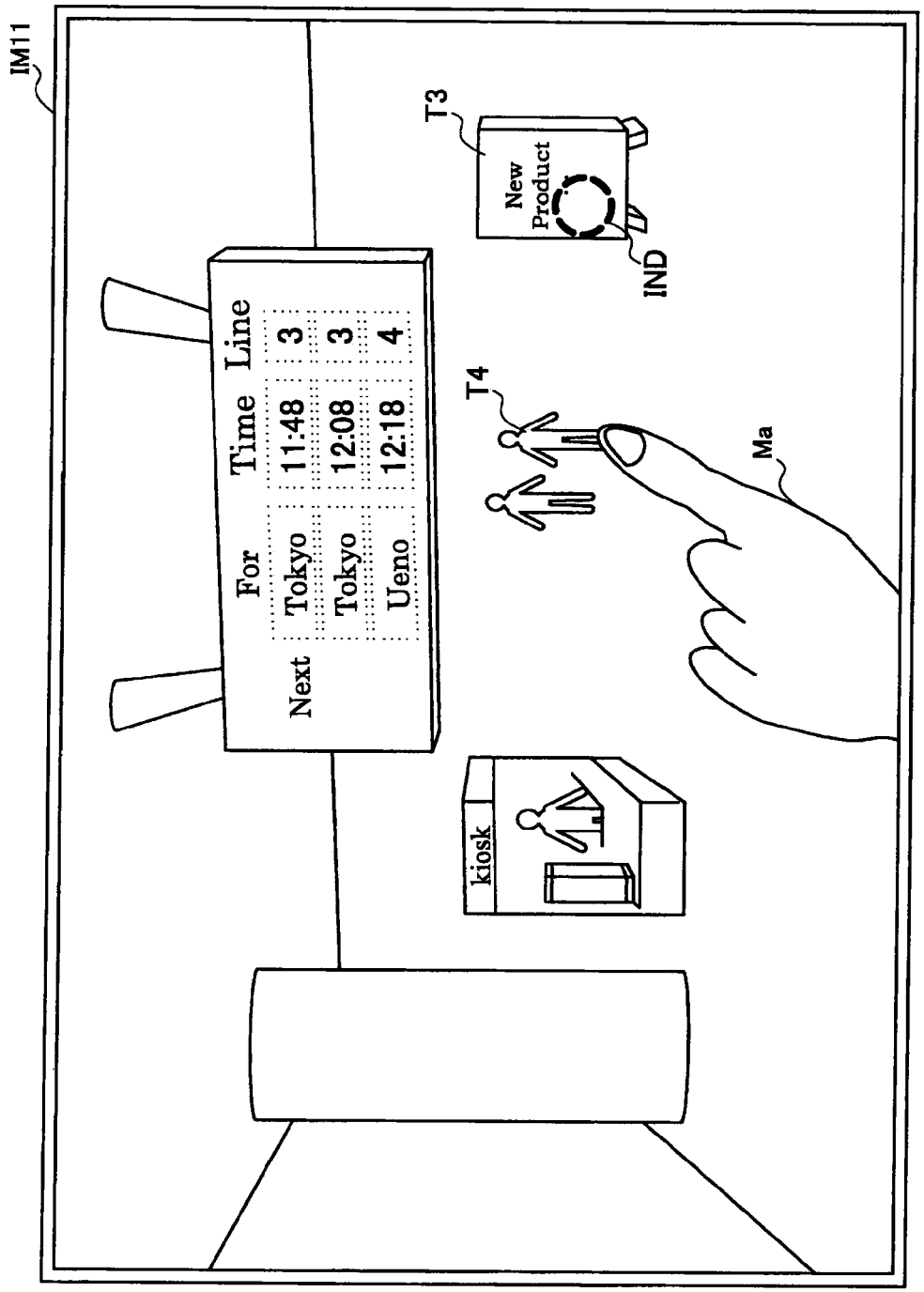
FIG. 9 is a diagram useful in explaining one example of an output image generated by an embodiment of the present invention.

FIG. 9 is a diagram useful in explaining one example of an output image generated by the output image generating unit 170. FIG. 9 shows an output image IM11 as one example. In the output image IM11, although the pointer Ma is positioned on the person T4, an indicator IND is displayed on the sign T3. The position where the indicator IND is displayed is the position specified by the specifying unit 160 by carrying out the processing described with reference to FIG. 8. By referring to such an output image IM11 in this way, a user on the receiver side (for example, the user Ub in FIG. 1) can easily recognize that the user on the pointer side (for example, the user Ua in FIG. 1) is pointing to the sign T3 using the pointer Ma.

Note that when the HMD 104 is a see-through display, for example, the output image generating unit 170 generates an image of only the indicator IND as the output image. Meanwhile, when the HMD 104 is a non-see-through display, the output image generating unit 170 generates an output image where the indicator IND is superimposed on the input image.

3. FLOW OF IMAGE PROCESSING ACCORDING TO AN EMBODIMENT OF THE PRESENT INVENTION

Figure 10:
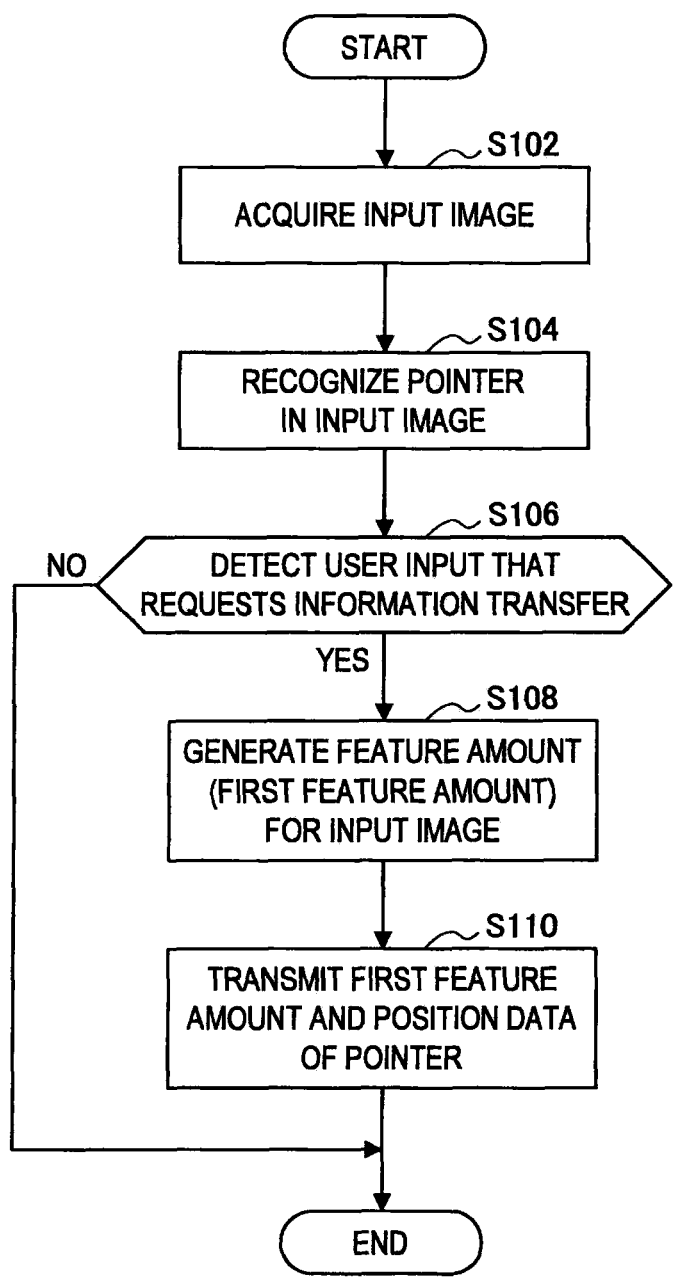
FIG. 10 is a flowchart showing one example of the flow of image processing on a pointer side according to an embodiment of the present invention.
Figure 11:
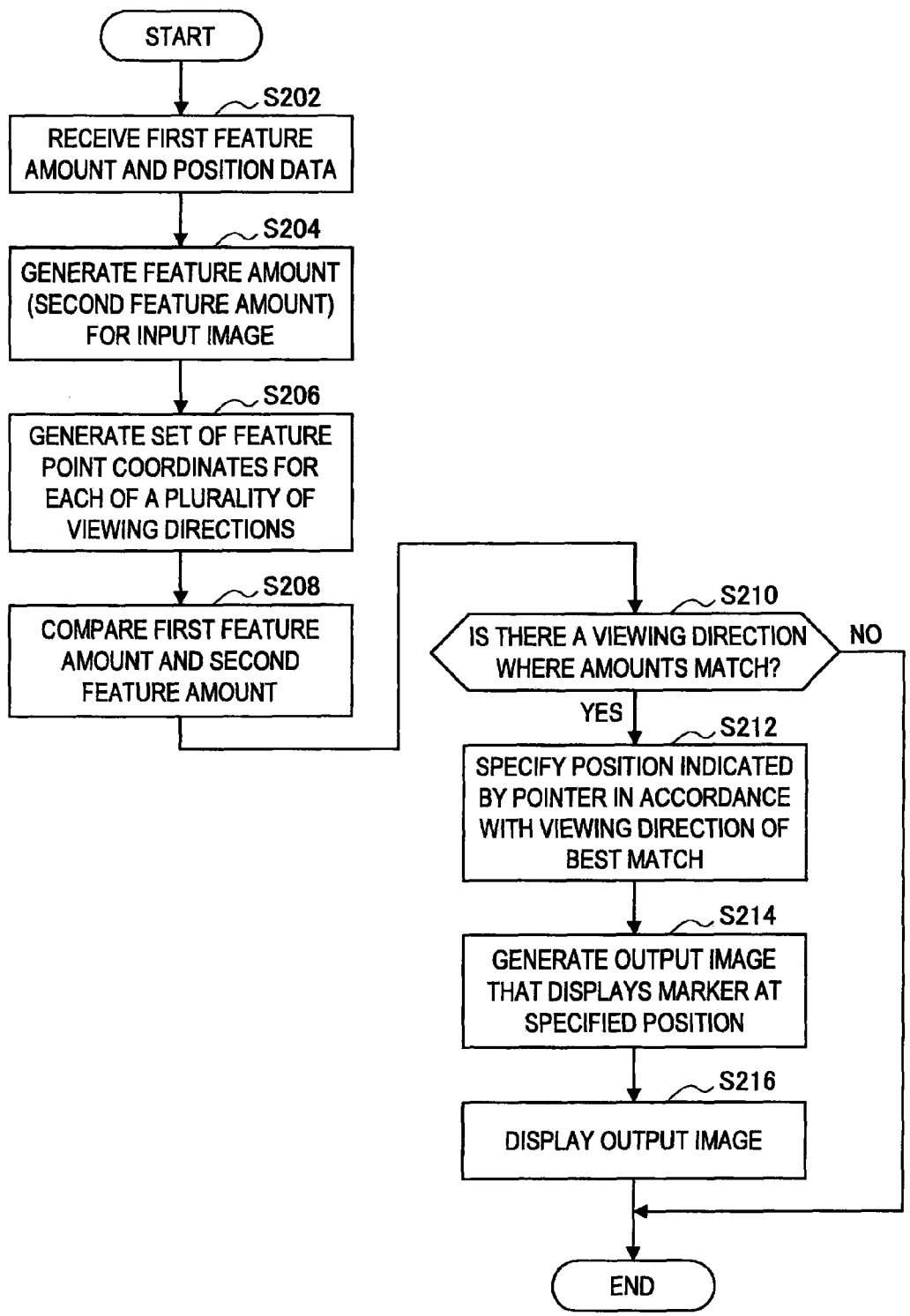
FIG. 11 is a flowchart showing one example of the flow of image processing on a receiver side according to an embodiment of the present invention.

Next, the flow of the image processing by the image processing apparatus 100 according to the present embodiment will be described with reference to FIGS. 10 and 11. FIG. 10 is a flowchart showing one example of the flow of image processing on the pointer side by the image processing apparatus 100. FIG. 11 is a flowchart showing one example of the flow of image processing on the receiver side by the image processing apparatus 100.

3-1. Pointer Side

FIG. 10 shows one example of the flow of image processing carried out for each frame in a series of input images by the image processing apparatus 100 on the pointer side. First, the input image acquisition unit 110 acquires an input image from the image pickup apparatus 102 (step S102). Next, by comparing the input image with a pointer image stored in the storage unit 120, for example, the image recognition unit 130 recognizes a pointer in the input image (step S104). Next, the image recognition unit 130 recognizes a user input indicated by a gesture using the pointer, for example. Here, if a user input that requests information transfer has been detected, the processing proceeds to step S108. Meanwhile, if a user input has not been detected, the subsequent processing is skipped (step S106).

When the image recognition unit 130 has detected a user input that requests information transfer in step S106, the feature amount generating unit 140 sets a plurality of feature points in the input image and generates the first feature amounts (step S108). The communication unit 150 then transmits position data expressing the position of the pointer recognized by the image recognition unit 130 and the first feature amounts generated by the feature amount generating unit 140 (step S110).

3-2. Receiver Side

The image processing illustrated in FIG. 11 is typically carried out by the image processing apparatus 100 on the receiver side in response to reception of the first feature amounts and position data described earlier from the image processing apparatus 100 on the pointer side.

First, the communication unit 150 receives the first feature amounts and position data transmitted from the image processing apparatus 100 on the pointer side (step S202). Next, the feature amount generating unit 140 sets a plurality of feature points in the input image acquired by the input image acquisition unit 110 and generates the second feature amounts (step S204). After this, the specifying unit 160 generates, from the first feature amounts, a plurality of sets of feature point coordinates produced by respectively converting the coordinates of the feature points for each of a plurality of directions for the line of vision (step S206). Next, the specifying unit 160 compares each set out of the plurality of sets of feature point coordinates generated from the first feature amounts with the second feature amounts (step S208). Here, since it is not possible to specify the location that the pointer is pointing at when none of the sets of feature point coordinates sufficiently matches the second feature amounts (for example, when the total sum of the errors is not below a specified threshold), the subsequent processing is skipped. Meanwhile, when one of the sets of feature point coordinates matches the second feature amounts, the processing proceeds to step S212 (step S210).

Next, in accordance with the direction of the line of vision corresponding to the set of feature point coordinates that best matches the second feature amounts, the specifying unit 160 specifies the position in the input image on the receiver side of the location that the pointer is pointing at (step S212). After this, the output image generating unit 170 generates an output image that displays an indicator indicating the position specified by the specifying unit 160 (step S214). Next, the display unit 180 displays the output image generated by the output image generating unit 170 on the HMD 104 (step S216).

Note that as one example, out of the image processing illustrated in FIG. 11, steps S204 to S216 may be repeatedly executed for each input image for a specified period after the first feature amounts and position data have been received. When doing so, for frames where the content of the input image has not changed from the previous frame (that is, when there has been no change in the direction of the line of vision of the user on the receiver side) the comparing process for feature amounts may be omitted. In this case, an indicator indicating the position specified for a previous frame is displayed on the output image.

4. CONCLUSION

The image processing system 1 and the image processing apparatus 100 according to an embodiment of the present invention have been described thus far with reference to FIGS. 1 to 11. According to the present embodiment, a first image processing apparatus 100 on the pointer side recognizes a pointer appearing in an input image and also generates first feature amounts including feature point coordinates for the first input image and transmits the generated first feature amounts and position data showing the position of the pointer. Next, a second image processing apparatus 100 on the listener side generates second feature amounts including feature point coordinates for a second input image and compares the first feature amounts received from the first image processing apparatus 100 and the second feature amounts. In accordance with the result of the comparison, the second image processing apparatus 100 specifies the location in the real space that the pointer is pointing at in a second input image and displays an indicator indicating such location in the output image. By doing so, it is possible for the user of the second image processing apparatus 100 to correctly and easily recognize the location that the user of the first image processing apparatus 100 is pointing at.

In the present embodiment, the comparison of the first feature amounts and the second feature amounts is carried out by matching each set out of a plurality of sets of feature point coordinates generated by rotating a set of feature point coordinates included in one of such feature amounts for each of a plurality of line of vision directions against the other of such feature amounts. One out of the plurality of line of vision directions is then selected in accordance with the best-matching set of feature point coordinates. The line of vision direction selected here corresponds to the relative displacement between the line of vision directions of the users. This means that by specifying the location that the pointer is pointing at in accordance with the selected line of vision direction, it is possible to correctly recognize a location that a user with a different line of vision direction is pointing at.

Note that the present specification describes an example where a graphic surrounding the location that the pointer is pointing at is displayed as an indicator. However, as a further example, it is also possible to apply object recognition technology based on pattern matching to recognize the shape of the object that the pointer is pointing at, and then display a frame or the like that follows the shape of the object in the output image. Also, supplementary information such as the name and attributes of the recognized object may be displayed in the output image.

The series of processes carried out by the image processing apparatus 100 described in the present specification is typically realized using software. As examples, a program that constructs the software that realizes the series of processes may be stored in advance inside the image processing apparatus 100 or in a storage medium provided externally. Such program may be written in a RAM (Random Access Memory) of the image processing apparatus 100 during execution, for example, and executed by a processor such as a CPU (Central Processing Unit).

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

The invention claimed is:

1. A first information processing apparatus comprising:
    circuitry configured to:
        acquire an image seen by a first user;
        acquire an object specified by a pointer, wherein the object is pointed to by the first user of the first information processing apparatus in the image seen by the first user;
        share the acquired object with a second user of a second information processing apparatus, wherein the second information processing apparatus recognizes the object acquired by the first information processing apparatus in a second image seen by the second user;
        rotate the image seen by the first user in a plurality of line of vision directions;
        select a line of vision direction from among the plurality of line of vision directions; and specify, based on the selected line of vision direction, a position in the image seen by the first user pointed at by the pointer.

2. The first information processing apparatus of claim 1, wherein the circuitry is further configured to recognize the pointer by detecting a finger image appearing in the image seen by the first user.

3. The first information processing apparatus of claim 2, wherein the circuitry is further configured to generate first feature amounts, including coordinates of a plurality of feature points, set in the image seen by the first user.

4. The first information processing apparatus of claim 3, wherein the circuitry is further configured to transmit the first feature amounts generated for the image seen by the first user and position data showing the position of the pointer.

5. The first information processing apparatus of claim 4, wherein at least one of the first feature amounts generated from the image seen by the first user represents a same feature in a real space as at least one feature point in the second image seen by the second user.

6. The first information processing apparatus of claim 4, wherein the first feature amounts include a plurality of sets of coordinates of feature points respectively set in the image seen by the first user in an event the image seen by the first user has been rotated in each of the plurality of line of vision directions.

7. The first information processing apparatus of claim 6, wherein the circuitry is further configured to specify, based the position data, the position in the image seen by the first user pointed at by the pointer.

8. The first information processing apparatus of claim 7, wherein the circuitry is further configured to generate an output image that displays a graphic surrounding the position specified by the pointer.

9. A method, in a first information processing apparatus, the method comprising:
  acquiring, by the first information processing apparatus an image seen by a first user;
  acquiring an object as a pointer, wherein the object is pointed to by the first user of the first information processing apparatus in the first image seen by the user; and
  sharing the acquired object with a second user of a second information processing apparatus, wherein the second information processing apparatus recognizes the object acquired by the first information processing apparatus in a second image seen by the second user;
  rotating the image seen by the first user in a plurality of line of vision directions;
  selecting a line of vision direction from among the plurality of line of vision directions; and
  specifying, based on the selected line of vision direction, a position in the image seen by the first user pointed at by the pointer.

10. A non-transitory computer-readable medium having stored thereon a set of computer executable instructions which, when executed, cause an information processing apparatus to perform a method comprising:
  acquiring, by the first information processing apparatus, an image seen by a first user;
  acquiring an object specified by a pointer, wherein the object is pointed to by the first user of the first information processing apparatus in the first image seen by the user;
  sharing the acquired object with a second user of a second information processing apparatus, wherein the second information processing apparatus recognizes the object acquired by the first information processing apparatus in a second image seen by the second user;
  rotating the image seen by the first user in a plurality of line of vision directions;
  selecting a line of vision direction from among the plurality of line of vision directions; and
  specifying, based on the selected line of vision direction, a position in the image seen by the first user pointed at by the pointer.

11. A first information processing apparatus comprising:
  circuitry configured to:
    acquire an image seen by a first user;
    acquire an object specified by a pointer, wherein the object is pointed to by the first user of the first information processing apparatus in the image seen by the first user;
    share the acquired object with a second user of a second information processing apparatus, wherein the second information processing apparatus recognizes the object acquired by the first information processing apparatus in a second image seen by the second user;
    rotate the image seen by the first user in a plurality of line of vision directions;
    select a line of vision direction from among the plurality of line of vision directions;
    specify, based on the selected line of vision direction, a position in the image seen by the first user pointed at by the pointer; and
    generate an output image that displays a graphic surrounding the position specified by the pointer.

12. A first information processing apparatus comprising:
  circuitry configured to:
    acquire an image seen by a first user;
    acquire an object specified by a pointer, wherein the object is pointed to by a finger of the first user of the first information processing apparatus in the image seen by the first user;
    share the acquired object with a second user of a second information processing apparatus, wherein the second information processing apparatus recognizes the object acquired by the first information processing apparatus in a second image seen by the second user;
    recognize the pointer by detecting a finger image appearing in the image seen by the first user;
    generate first feature amounts, including coordinates of a plurality of feature points, set in the image seen by the first user;
    transmit the first feature amounts generated for the image seen by the first user and position data showing a position of the pointer, wherein the first feature amounts include a plurality of sets of coordinates of feature points respectively set in the image seen by the first user in an event the image seen by the first user has been rotated in each of a plurality of line of vision directions; and
    select a line of vision direction from among the plurality of line of vision directions.

* * * * *